United States Patent [19]
Bartz et al.

[11] Patent Number: 5,510,093
[45] Date of Patent: Apr. 23, 1996

[54] COMBUSTIVE DESTRUCTION OF HALOGENATED COMPOUNDS

[75] Inventors: David Bartz, Santa Clara; Robert M. Kendall, Sunnyvale; Frederick E. Moreno, Los Altos, all of Calif.

[73] Assignee: Alzeta Corporation, Santa Clara, Calif.

[21] Appl. No.: 280,072

[22] Filed: Jul. 25, 1994

[51] Int. Cl.⁶ ............................ F23D 14/12; F23G 7/06; B01D 53/64; B01D 53/70
[52] U.S. Cl. .................. 423/240 R; 423/210; 423/245.3; 588/213; 588/234; 588/245; 431/5; 431/7
[58] Field of Search ............................ 423/245.3, 245.1, 423/210, 240 R, 337; 588/248, 209, 234, 240, 245, 213; 431/5, 7, 328

[56] References Cited

U.S. PATENT DOCUMENTS

| | | | |
|---|---|---|---|
| 3,840,344 | 10/1974 | Garbo | 423/450 |
| 4,048,290 | 9/1977 | Lee | 423/592 |
| 4,206,711 | 6/1980 | Konrad | 110/238 |
| 4,801,437 | 1/1989 | Konagaya et al. | 423/210 |
| 4,828,481 | 5/1989 | Weil et al. | 431/7 |
| 5,183,646 | 2/1993 | Anderson et al. | 423/245.3 |
| 5,211,552 | 5/1993 | Krill et al. | 431/7 |

FOREIGN PATENT DOCUMENTS

| | | | |
|---|---|---|---|
| 716574 | 2/1980 | U.S.S.R. | 423/245.3 |

*Primary Examiner*—Michael Lewis
*Assistant Examiner*—Peter T. DiMauro
*Attorney, Agent, or Firm*—Paul W. Garbo

[57] ABSTRACT

The disposal of troublesome substances, especially global-warming halogenated compounds is difficult enough, but is particularly difficult when associated with particulate-forming matter, such as silane and arsine commonly encountered in waste gas streams of the semiconductor industry. The combustive destruction of the troublesome substances in such a waste gas stream is simply and successfully achieved by injecting the stream admixed with fuel gas into a combustion zone surrounded by the radiant surface of a foraminous gas burner that is separately fed fuel gas and excess air sufficient to burn all the combustibles entering the combustion zone. A simple apparatus integrates the combustion zone with a quenching zone for the combustion product stream.

11 Claims, 2 Drawing Sheets

COMBUSTIVE DESTRUCTION OF HALOGENATED COMPOUNDS

BACKGROUND OF THE INVENTION

This invention relates to the disposal by combustive destruction of troublesome substances, especially global-warming, air-polluting halogenated compounds, such as fluorocarbons, and particulate-forming matter upon oxidation, such as silane.

Fluorocarbon gases such as $C_2F_6$ and $CF_4$ are global-warming compounds when released into the atmosphere where they have extremely long lifetimes. These gases as well as other fluorinated gases such as $NF_3$ and $SF_6$ are used in the manufacture of semiconductors during the etching, modification and construction of silicon wafers, and during the cleaning of the machines used in the process. Hydrides, such as silane ($SiH_4$) which ignites upon exposure to air, are also used in the process of making silicon wafers. The fluorinated gases and hydrides and even particulate matter are swept out of the machines with nitrogen, sometimes together and sometimes sequentially.

According to current practice, the nitrogen stream containing the troublesome gases is subjected to thermal destruction using electrical heat or gas firing. However, complete destruction of the undesired gases is achieved only with a large consumption of thermal energy. Another current technique of mixing the stream with hydrogen and effecting combustion is unsatisfactory because of the large usage of expensive hydrogen.

It is significant that these expensive and unsatisfactory disposal methods are in use even though several patents propose other procedures. For example, U.S. Pat. No. 4,627,388 burns halogenated hydrocarbon waste in a horizontal fire tube boiler requiring a refractory lined combustion chamber of substantial length to contain the flame front near adiabatic conditions. U.S. Pat. No. 4,206,711 uses a vertical combustion chamber wherein liquid waste is sprayed down from the top, while several flat flame radiation type burners in the walls of the chamber provide flames that totally surround the sprayed waste. U.S. Pat. No. 4,828,481 eliminates the large and costly equipment of the aforesaid patents by proposing a combustion chamber comprising two opposed porous plates between which combustion is carried out. A mixture of gaseous fuel, air, and waste vapor is fed through one porous plate, burned in the chamber, and the combustion products are exhausted through the other porous plate. However, the waste material must be free of particles or the inlet porous plate will become plugged. Even in the absence of particles in the waste material, there is the real danger that particles, such as soot or silica (if silane is in the waste), will form during combustion and plug the outlet porous plate. The need for a practical disposal system still exists.

In industrial practice, the gaseous stream carrying one or more halogenated compounds may also contain particulate-forming matter upon oxidation, simultaneously or sequentially. Silane which oxidizes in air to silica, and another often used hydride, arsine ($ASH_3$) which oxidizes to a troublesome sticky oxide ($As_2O_3$), are illustrative of particulate-forming matter commonly associated with halogenated compounds, particularly the fluorocarbons used in the semiconductor industry.

Besides the fluorinated gases of the semiconductor industry, air pollutants encountered in other industries include chlorinated hydrocarbons such as carbon tetrachloride, trichloroethylene, chlorobenzene and vinyl chloride. The refrigeration industry has long favored chlorofluorohydrocarbons as refrigerant gases but these gases are now being phased out of future use. A satisfactory system for the disposal of all these halogenated compounds is still wanting.

A principal object of this invention is to provide a simple and economic system for the combustive destruction of halogenated compounds and/or particulate-forming matter upon oxidation.

A further object is to provide an apparatus and a process that achieve substantially complete combustive destruction of troublesome substances while suppressing the formation of air pollutants, namely, nitrogen oxides ($NO_x$), carbon monoxide (CO) and unburned hydrocarbons (UHC), that are commonly formed during combustion.

Another important object is to utilize apparatus that is simple and economic to construct and operate.

These and other features and advantages of the invention will be apparent from the description which follows.

SUMMARY OF THE INVENTION

In accordance with this invention, troublesome substances, especially halogenated compounds and particulate-forming matter upon oxidation are substantially completely (at least 95%) destroyed by combustion in a process comprising the steps of mixing a fuel gas with the stream containing troublesome substances and injecting the mixture into a destructive combustion zone maintained at a temperature of at least 1,900° F. by effecting flameless combustion of a fuel and excess air mixture on the exit surface of a foraminous gas burner that surrounds the combustion zone. The excess air passing through the foraminous burner is sufficient to consume not only the fuel supplied to the burner but also all the combustibles in the mixture injected directly into the destructive combustion zone. Even then, there should be enough excess air so that free oxygen remains in the product gas stream leaving the combustion zone. Generally, to achieve substantially complete (at least 95%) combustion of the troublesome substances, the amount of excess air should be at least about 10% more than the stoichiometric requirement to burn all the combustibles entering the combustion zone.

In most cases, natural gas is the most cost-effective fuel that can be supplied to the foraminous gas burner and separately admixed with halogenated compounds and/or particulate-forming matter injected into the destructive combustion zone. Other hydrocarbons and hydrogen are alternate fuels but generally are used only where natural gas is not available.

The foraminous gas burner used in accordance with this invention includes two basic forms: a porous fiber layer and a perforated plate. The porous fiber layer form involves a porous coherent layer of noncombustible fibers of either the mineral type or the metallic type. U.S. Pat. No. 3,179,156 to Weiss et al teaches the deposition of alumina-silica fibers on a screen from an aqueous suspension of the fibers containing a binding agent which interconnects the fibers to one another and to the screen. This basic porous fiber burner made with ceramic fibers preferably contains a small amount of aluminum powder as taught by U.S. Pat. No. 3,383,159 to Smith or aluminum alloy powder as taught by U.S. Pat. No. 4,746,287 to Lannutti. U.S. Pat. No. 3,173,470 to Wright discloses a porous fiber burner in which a layer of metal fibers is made coherent by sintering. A recently developed hybrid fiber burner formed from a mixture of metal fibers and ceramic fibers is taught by U.S. Pat. No. 5,326,631 of Carswell et al.

The perforated plate form of foraminous gas burner is shown in numerous patents. U.S. Pat. No. 2,775,294 to Schwank shows an early example of a perforated plate burner. Other forms of perforated plate burners are illustrated in U.S. Pat. No. 3,683,058 to Parriot and U.S. Pat. No. 3,954,387 to Cooper.

All of the foregoing foraminous gas burners as well as variations thereof widely described in patents and technical publications serve the purposes of this invention.

The exit surface of the foraminous burner where flameless combustion takes place surrounds the destructive combustion zone into which the mixture of halogenated compounds and/or particulate-forming matter and added fuel is injected. The resulting incandescent exit surface of the burner emits infrared radiation that helps to maintain the destructive combustion zone at a temperature of at least 1,900° F. The fuel gas fed together with excess air to the foraminous burner is consumed by flameless combustion at the exit surface of the burner and the resulting combustion product gas flowing outwardly from that surface prevents the deposition thereon of particulate matter entering or forming in the destructive combustion zone because of a hydride such as arsine injected thereinto. The deposition of particulate matter at the exit of any burner is troublesome and is extremely so when the particulate matter is a sticky substance such as $As_2O_3$ formed when arsine is present in the stream injected into the destructive combustion zone. The selection of foraminous burners to prevent the deposition of particulate matter within the destructive combustion zone is essential to the successful performance of the invention.

In contrast to the flameless surface combustion of the fuel gas supplied to the foraminous burner, the combustibles of the stream separately injected into the destructive combustion zone burn with a diffusion flame. Inasmuch as the air required to burn the combustibles in the injected stream is separately fed to the combustion zone through the porous fiber burner, it is prudent to inject that stream in the form of several small streams so that the excess air leaving the exit surface of the foraminous burner can more rapidly react with the waste combustibles. Clearly, it takes longer for the air to reach all of the combustibles in a stream of large diameter than it does in several divisions of that stream. Stated another way, several small streams will have a shorter flame than that of a single stream having a volume equal to the total volume of the several small streams.

The combustion product stream leaving the destructive combustion zone is noteworthy for two reasons: at least 95% of the halogenated compounds fed to the zone have been destroyed and the formation of $NO_x$, CO and UHC have been suppressed to very low values. The combustion product stream will contain HF and HCl to the extent that fluorine and chlorine were present in the halogenated compounds fed to the destructive combustion zone. Oxide particles will be in the combustion product stream to the extent that hydrides such as silane and arsine were present in the stream entering the combustion zone. The product stream will also contain any noncombustible particles present in the waste stream fed to the combustion zone.

The combustion product stream must be cooled and scrubbed to capture the HF and HCl and particulate matter present therein as well as sulfur dioxide if $SF_6$ was present in the stream of halogenated compounds. A simple and effective way of cooling and even starting the capture of HF and HCl is to discharge the product stream from the combustion zone directly into a column in which a flow of water coats the inner surface. Spraying water into the product stream discharged from the destructive combustion zone is also effective. The thus quenched product stream is then passed through a scrubber which may be in any of its known forms. The scrubbed gas is vented to the atmosphere as an environmentally safe gas.

BRIEF DESCRIPTION OF THE DRAWINGS

To facilitate the further description and understanding of the invention, reference will be made to the accompanying drawings of which.

DESCRIPTION OF PREFERRED EMBODIMENTS

Figure 1:
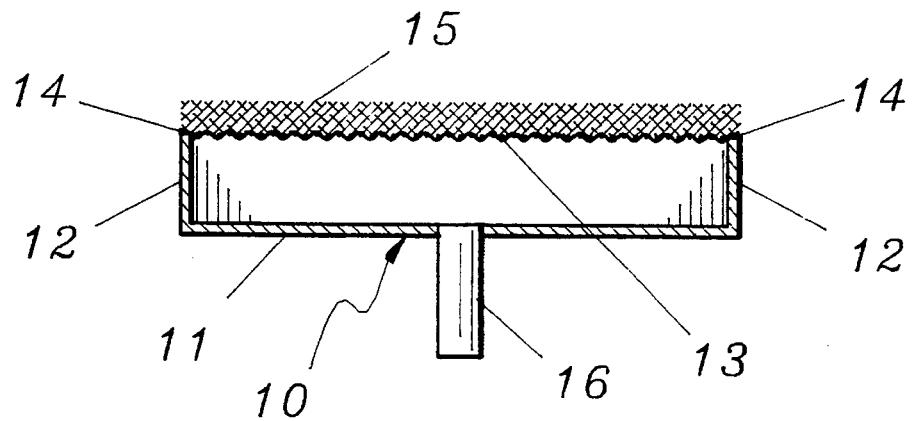
FIG. 1 is a sectional view of a rectangular pan-type porous fiber layer burner.

FIG. 1 is a cross-section of a pan-type porous fiber layer burner 10 transverse to its length. Metal pan 11 has side walls 12 with screen 13 welded to the ends 14 of side walls 12. A porous layer 15 of ceramic fibers is deposited on, and attached to, screen 13. The porous layer 15 provides the exit surface at which a mixture of fuel gas and air will burn without visible flame and become radiant. The fuel gas-air mixture is fed to burner 10 through pipe 16 connected to metal pan 11.

Figure 2:
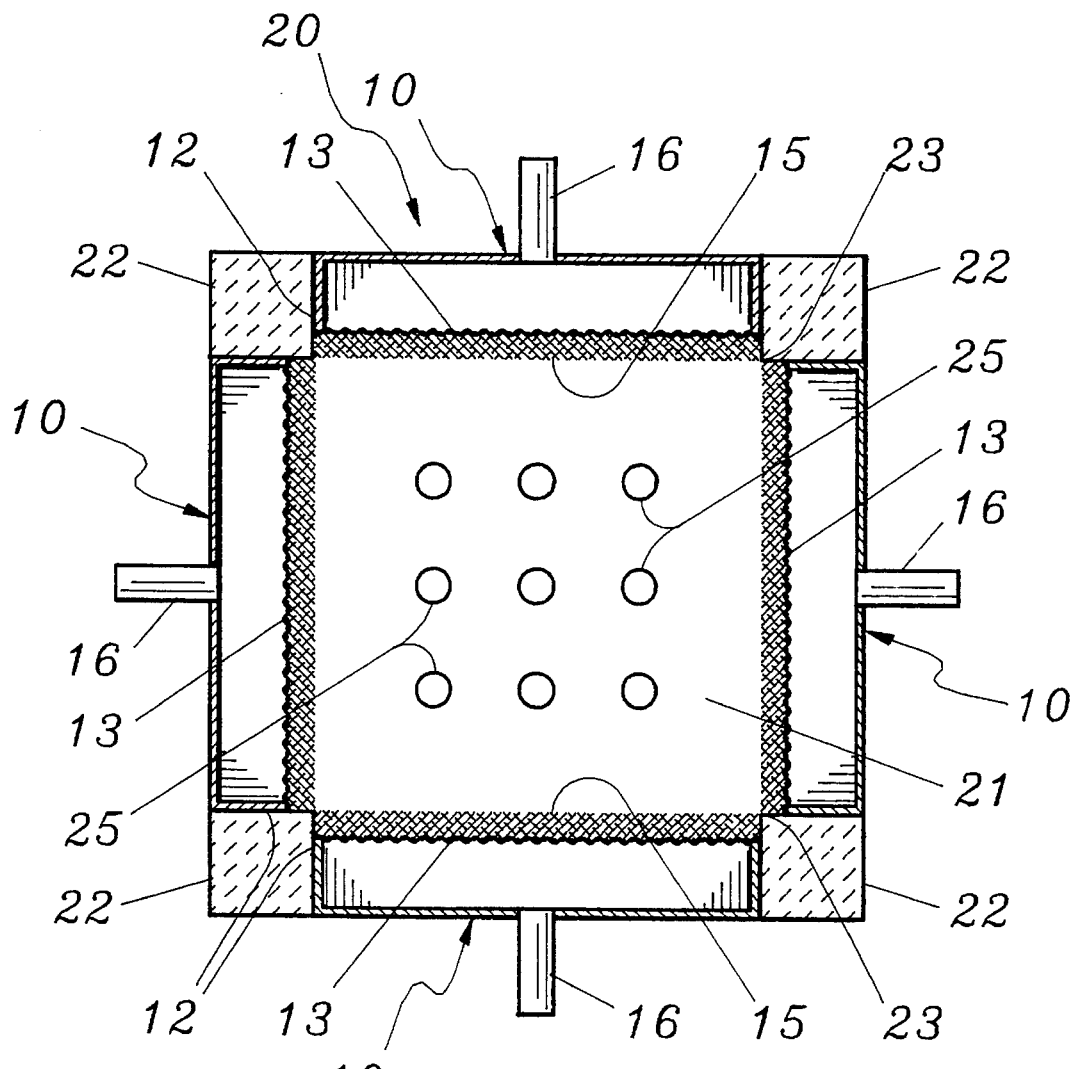
FIG. 2 is a diagrammatic horizontal sectional view of four burners of FIG. 1 arranged to form a vertical furnace for the practice of the invention.

FIG. 2 forms a furnace 20 useful for the practice of this invention by having four porous surface burners 10 of FIG. 1 arranged to form a square adiabatic combustion zone 21. Where each pair of burners 10 meet at right angles to one another, a refractory post 22 is cemented to the side walls 12 of the contiguous burners 10 so that the products of combustion cannot leak along the vertical (normal to FIG. 2) juncture line 23 of contiguous burners 10. By this arrangement, four burners 10 act as an inwardly fired furnace with a destructive combustion zone 21 surrounded by the exit surface 15 of burners 10. FIG. 2 demonstrates that a furnace suitable for this invention may be formed of modular burners 10.

A waste stream containing halogenated compounds and/or particulate-forming matter and added fuel gas enters the top of furnace 20 through multiple openings 25 as small streams that flow down into combustion zone 21 where excess air exiting from porous fiber layers 15 achieves the combustive destruction of the troublesome compounds. It is understood that the bottom end of furnace 20 is open and connected to a water-cooling column for the capture, as previously explained, of any HF, HCl, $SO_2$ and particles in the combustion product stream flowing from combustion zone 21.

Figure 3:
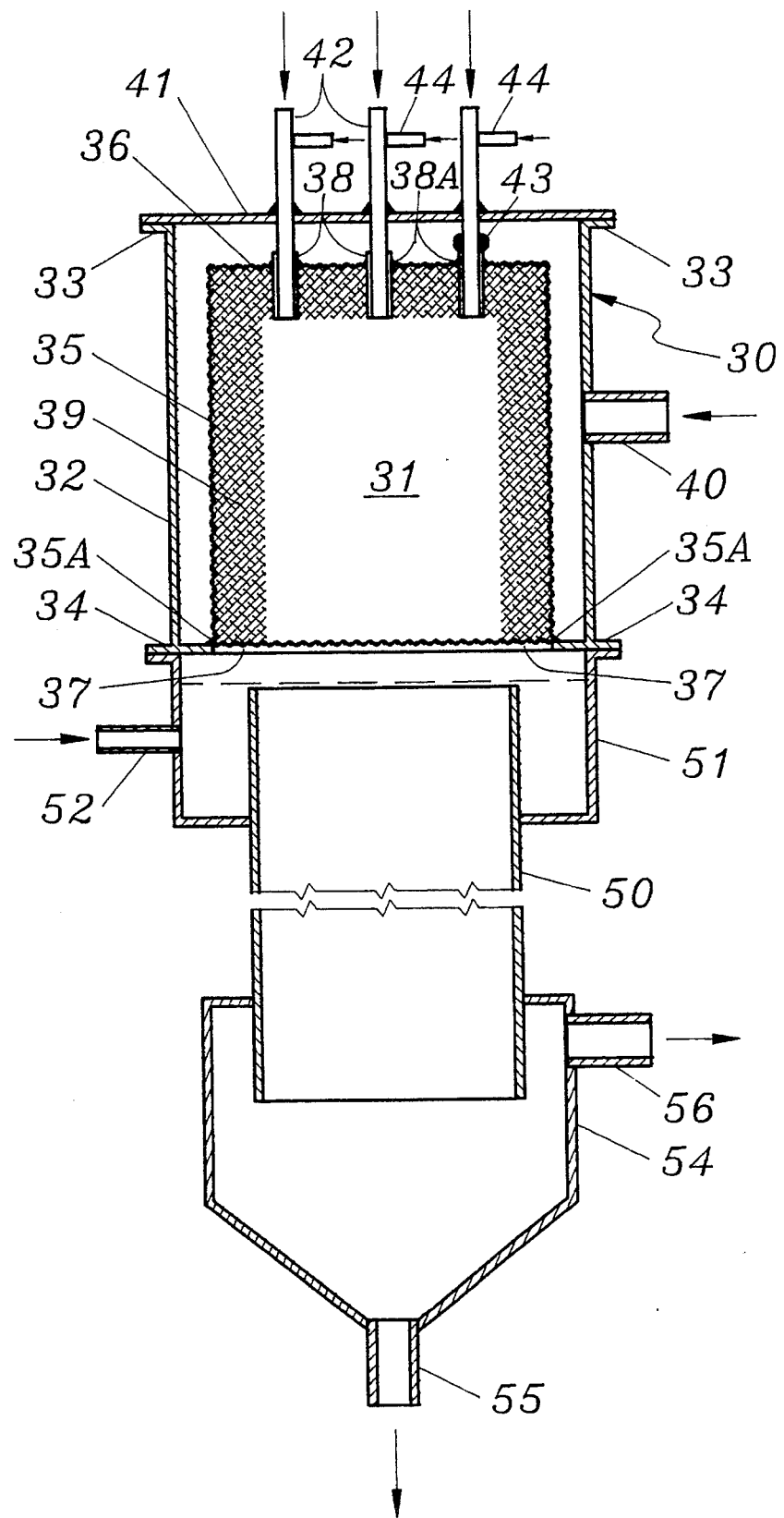
FIG. 3 is a diagrammatic sectional elevation of a preferred form of furnace, shown in association with desirable equipment for feeding the furnace and for treating the gaseous effluent therefrom.

A preferred furnace 30 is shown in FIG. 3 with desirable auxiliary equipment for feeding a waste stream of halogenated compounds and/or particulate-forming matter and added hydrocarbon gas to its destructive combustion zone 31 and for treating the combustion product stream issuing therefrom. Furnace 30 is formed by cylindrical steel shell 32 with flanges 33,34 at its opposite ends. Bottom flange 34 extends inwardly and outwardly from shell 32. Cylindrical metal screen 35 having its top connected to screen 36 and having inward screen flange 37 connected to flange 34 is concentrically held within shell 30 and spaced therefrom. Weld 35A fastens screen 35 to the inner edge of flange 34. Several tubes 38 extend through and are welded to top screen 36. All of the inner face of screen 35, 36, 37 has an adherent porous layer 39 of ceramic and/or metal fibers. Shell 32 has one or more pipes 40 for introducing a mixture of fuel gas and excess air into the space around screens 35, 36 so that the mixture will flow through porous fiber layer 39 and, upon ignition, will maintain flameless combustion at the exit surface of fiber layer 39.

Steel plate 41 supported by and attached to top flange 33 by bolts (not shown) holds as many tubes 42 as there are tubes 38 fastened to screen 36 by weld 38A. Tubes 42 are of a smaller diameter than that of tubes 38 and are long enough so that the bottom ends of tubes 42 reach the bottom ends of tubes 38. The spacing of tubes 42 extending vertically through plate 41 and welded thereto must be carefully laid out so that, when plate 41 is brought down to rest on flange 33 of shell 32, each tube 42 will slide through a tube 38. Any leakage of the gas-air mixture from the space above screen 36 through the clearance between concentric tubes 38 and tubes 42 is generally tolerable. However, if desired, such leakage can be easily stopped by a ring 43 of elastomer on each tube 42 positioned to seat against the top end of tube 38 when tube 42 has been fully inserted in tube 38.

Furnace 30 is connected to cooling column 50 so that the bottom open end of destructive combustion zone 31 is aligned with column 50 which has an annular trough 51 around its top end. Water is supplied to trough 51 through pipe 52 and overflows the top end of column 50 to provide a continuous flow of water down the inner surface of column 50 thereby cooling the combustion product stream leaving zone 31 and preventing particles in that stream from adhering to the inner surface of column 50. The gaseous stream and water discharge from the bottom end of column 50 into separator 54 having drain pipe 55 for the withdrawal of water containing particulate matter and soluble compounds such as HF, HCl, and $SO_2$. The cooled gaseous stream exits from separator 54 through pipe 56 and is passed through a scrubber (not shown) in any of its many known forms to capture residual soluble compounds in the gaseous stream leaving separator 54. The scrubbed gas is vented to the atmosphere as an environmentally safe exhaust.

A waste stream containing halogenated compounds and/or particulate-forming matter is fed to tubes 42 while fuel gas is added to that stream via tubes 44. The resulting mixture flows down tubes 42 into combustion zone 31 where the combustibles thereof are consumed as separate flames projecting from the bottom ends of tubes 42 upon meeting excess air supplied through porous fiber layer 39.

Tests were conducted with a furnace having a cylindrical (3 inches in diameter and 12 inches long) destructive combustion zone surrounded by a porous ceramic fiber burner as illustrated by screen 35 and porous fiber layer 39 in furnace 30 of FIG. 3. A nitrogen stream containing 8% by volume of $C_2F_6$ was injected into the combustion zone at the rate of 20 liters per minute, while natural gas and excess air were passed through the porous fiber burner to effect surface combustion at the rate of 42,000 BTU (British Thermal Unit) per hour per square foot of burner surface. The excess air supplied to the burner was 61% more than the stoichiometric requirement of the natural gas simultaneously supplied to the burner. The combustion product gas contained 11.3% by volume of residual oxygen. Analysis of this product gas revealed that only 56% of the $C_2F_6$ injected into the furnace had been destroyed.

However, another test was carried out without making any changes in the foregoing operation except that 12% by volume (2.4 liters per minute) of natural gas was mixed with the nitrogen stream containing $C_2F_6$. In this case, the excess air supplied to the burner also burned the natural gas admixed with the nitrogen stream so that the residual oxygen in the combustion product gas dropped to 7.4% by volume. Analysis of the product gas showed that 99% of the $C_2F_6$ had been destroyed.

In another pair of tests, the burner was fired at the rate of 44,000 BTU per hour per square foot with 61% excess air and the flow of nitrogen containing 4% by volume of $C_2F_6$ was doubled to 40 liters per minute. In one test, natural gas was added to the waste nitrogen stream at the rate of 2.4 liters per minute (6% by volume). The combustion product gas contained 7.1% by volume of residual oxygen. Only 60% of the $C_2F_6$ was destroyed. Merely by increasing the addition of natural gas to 4.7 liters per minute (11.8% by volume) the destruction of $C_2F_6$ rose to 96% which is considered satisfactory when compared with current commercial processes that are more cumbersome and expensive. The residual oxygen in the combustion product gas dropped to 4.4% by volume.

In still another test, the supply of nitrogen containing 2% by volume of $C_2F_6$ was quadrupled to 80 liters per minute and the burner was fired at the rate of 58,000 BTU per hour per square foot with 61% excess air. Natural gas added to the nitrogen stream was 8.9% by volume (previous test 12%). The combustion product gas contained only 3.5% by volume of residual oxygen. The destruction of 99% of the $C_2F_6$ was achieved.

The first two tests demonstrate the critical need of supplying fuel gas admixed with the waste stream injected into the destructive combustion zone. The second pair of tests shows that increasing the amount of fuel gas mixed with the waste halogenated compound stream increased the combustive destruction of the halogenated compound. The last cited test makes it clear that even though a waste stream with allow concentration (2% by volume) of $C_2F_6$ was passed through the combustion zone at a rapid rate (80 liters per minute), 99% of the fluorocarbon was still destroyed. The several tests demonstrate the broad range of flow rates of waste stream with varying $C_2F_6$ concentrations that can be successfully processed in a combustion zone surrounded by the radiant surface of a foraminous gas burner.

The foregoing tests were carried out with $C_2F_6$ free of particulate-forming matter such as silane and arsine to facilitate the analysis of the combustion product gas to determine the percentage of $C_2F_6$ destruction achieved in each test. To establish what happens when silane enters the destructive combustion zone, a test was conducted in which silane was added to a nitrogen stream injected into the combustion zone at the rate of 40 liters per minute. The silane addition was 0.22 liter per minute for 1.5 hours and then increased to 0.31 liter per minute for another 1.5 hours. The addition of natural gas to the waste stream containing silane was at the rate of 4.7 liters per minute. As in other tests, the foraminous burner was fired at the rate of 44,000 BTU per hour per square foot with 61% excess air. The silane was completely destroyed and the resulting silica particles did not accumulate in the destructive combustion zone.

Additional tests were carried out on waste streams containing $CF_4$ alone and mixed with $C_2F_6$ and silane. The desired destruction of the fluorocarbons and silane was again accomplished. The efficacy of the combustive destruction of halogenated compounds and/or particulate-forming matter has been established and shown to be attainable by simple adjustments in the amounts of fuel gas fed to the foraminous burner and added to the waste stream containing troublesome substances even when the injection rate is varied over a wide range.

Simple tests have also provided guidelines for selecting for any waste stream the conditions that will yield in excess of 95% destruction of halogenated compounds which are resistant to breakdown. The fuel gas supplied to the foraminous burner should be at a rate of at least about 25,000 BTU per hour per square foot of burner surface. Combustion air is supplied solely to the burner in an amount that exceeds the stoichiometric requirement of both the fuel gas supplied to the burner and all the combustibles injected into the destructive combustion zone; a large air excess of at least about 50% relative to the fuel gas supplied to the foraminous burner is a good starting level in seeking the optimum conditions for any particular waste stream containing halogenated compounds and/or particulate-forming matter. The amount of fuel gas on a BTU basis supplied to the foraminous burner is always greater than that admixed with the waste stream. The ratio of burner fuel gas to waste stream fuel gas is usually in the range of about 2:1 to 5:1, high ratios being generally applicable to low rates of waste stream treatment and low ratios being generally applicable to high rates of waste stream treatment. These guidelines facilitate both the selection of the initial conditions for treating a particular waste stream containing halogenated compounds and/or particulate-forming matter, and then the adjustment of these initial conditions to attain a desired high level of halogenated compound and/or particulate-forming matter destruction such as 99%.

The invention is noteworthy for the simplicity and compactness of the furnace as well as for the simplicity of operation and low fuel consumption to easily effect 99% destruction of halogenated compounds and/or particulate-forming matter such as silane and arsine, while avoiding the troublesome deposition and accumulation of particulates such as $SiO_2$ and $As_2O_3$ within the combustion zone.

Those skilled in the art will readily visualize variations and modifications of the invention in light of the foregoing disclosure without departing from the spirit or scope of the invention. The term "foraminous gas burner" is used herein to include not only both porous and perforated burners but also such burners in unitary form as shown in FIG. 3 as well as in modular form as shown in FIG. 2. The many patents dealing with foraminous burners are certainly suggestive of many possible variations. Accordingly, only such limitations should be imposed on the invention as are set forth in the appended claims.

What is claimed is:

1. A process for the combustive destruction of particulate-forming hydrides and/or halogenated compounds selected from the group consisting of halogenated hydrocarbons, fluorocarbon gases, nitrogen trifluoride and sulfur hexafluoride, in a combustion zone laterally surrounded by the exit surface of a foraminous gas burner, which comprises injecting a stream containing at least one of said halogenated compounds and/or particulate-forming hydrides and added fuel gas into the top of said combustion zone, simultaneously supplying fuel gas and air to said foraminous gas burner to effect combustion at said exit surface, the amount of said fuel gas simultaneously supplied to said foraminous gas burner being, on a BTU basis, greater than that of said added fuel gas, and the amount of said air being in excess of the stoichiometric requirement of all combustibles entering said combustion zone, and discharging the resulting combustion product stream from the bottom of said combustion zone.

2. The process of claim 1 wherein the ratio of the amount of fuel gas supplied to the foraminous gas burner to the amount of fuel gas injected into the combustion zone is in the range of about 2:1 to 5:1, and said amount of fuel gas supplied to said foraminous gas burner yields upon combustion at least 25,000 BTU per hour per square foot of the exit surface of said foraminous gas burner.

3. The process of claim 1 wherein all of the fuel gas consumed by said process is natural gas and the amount of air supplied to the foraminous gas burner is at least about 50% in excess of the stoichiometric requirement of said natural gas supplied to said foraminous gas burner.

4. The process of claim 1 wherein the stream is nitrogen containing at least one fluorocarbon and/or a hydride discharged as a waste stream from the manufacture of semiconductors.

5. The process of claim 4 wherein the combustion product stream is discharged downwardly from the bottom of the combustion zone directly into a column while cooling water flows down the inner surface of the walls of said column.

6. The process of claim 5 wherein the fuel gas supplied to the foraminous gas burner is natural gas in an amount to yield upon combustion at least 25,000 BTU per hour per square foot of the exit surface of said foraminous gas burner.

7. The process of claim 6 wherein the fuel gas added to the stream is natural gas, and the ratio of the amount of natural gas supplied to the foraminous gas burner to the amount of natural gas injected into the combustion zone is in the range of about 2:1 to 5:1.

8. A process for the combustive destruction of particulate-forming hydrides and/or halogenated compounds selected from the group consisting of halogenated hydrocarbons, fluorocarbon gases, nitrogen trifluoride and sulfur hexafluoride, in a combustion zone laterally surrounded by the radiant surface of a foraminous gas burner, which comprises injecting a stream containing at least one of said halogenated compounds and/or particulate-forming hydrides and admixed fuel gas into the top of said combustion zone, said burner being supplied with fuel gas and excess air to yield at least 25,000 BTU per hour per square foot of said radiant surface, controlling on a BTU basis the ratio of the amount of said fuel gas supplied to said foraminous gas burner to the amount of said fuel gas admixed with said injected stream in the range of about 2:1 to 5:1 to achieve the combustive destruction of at least about 95% of the content of said halogenated compound and/or particulate-forming hydride in said injected stream, and discharging the resulting combustion product stream from the bottom of said combustion zone.

9. The process of claim 8 wherein the combustion product stream is discharged downwardly from the bottom of the combustion zone directly into a column while cooling water flows down the inner surface of the walls of said column.

10. The process of claim 9 wherein the injected stream is nitrogen containing at least one fluorocarbon and/or a hydride.

11. The process of claim 10 wherein all of the fuel gas consumed by said process is natural gas and the amount of air supplied to the foraminous gas burner is at least 50% in excess of the stoichiometric requirement of the portion of said natural gas supplied to said foraminous gas burner.

* * * * *